United States Patent Office 3,003,866
Patented Oct. 10, 1961

3,003,866
SELECTIVE ELUTION OF COPPER, NICKEL, AND COBALT FROM AMINOCARBOXYLIC ACID CHELATE EXCHANGE RESINS
Leonard A. Mattano and Francis D. Schwalm, Midland, Mich., assignors to The Dow Chemical Company, Midland, Mich., a corporation of Delaware
No Drawing. Filed June 18, 1958, Ser. No. 742,741
6 Claims. (Cl. 75—108)

This invention relates to the selective elution of the metal values from water-insoluble solid chelate exchange resins containing aminocarboxylic acid groups as the active chelate ligands laden with a mixture of at least two of the metals copper, nickel and cobalt in chelated form wherein the metal-laden resin is obtained by contacting a water-insoluble solid chelate exchange resin containing active aminocarboxylic acid ligands with a starting ammoniacal aqueous liquid solution containing ammine complex ions of at least two of the metals copper, nickel, and cobalt selected from the group consisting of bivalent ammine complex ions of cupric copper having ammonia coordination of from two to four, bivalent ammine complex ions of nickelous nickel having ammonia coordination of from two to six, and trivalent ammine complex ions of cobaltic cobalt having ammonia coordination of from two to six.

Water-insoluble solid chelate exchange resins having aminocarboxylic acid groups as the active chelate ligands are already known. Usually, the active ligands in these resins are $\alpha$- or $\beta$-amino carboxylic acid groups wherein the carboxylic acid groups are free to ionize in water media. Specific illustrations of suitable aminocarboxylic acid ligands are provided in the glycine, iminodiacetic acid, and aspartic acid groups. The resin structures to which the aminocarboxylic acid ligands are attached can be condensation-type resins or addition-type polymers, usually crosslinked to an appreciable extent. Resins of these kinds are described, for example, by H. P. Gregor et al. in Industrial and Engineering Chemistry, vol. 44, No. 12, pages 2834–2839 (1952) and by D. K. Hale in Research, vol 9, pages 104–108 (1956).

By way of specific illustration but not of limitation, it may be mentioned that suitable chelate exchange resins for the purposes to which this invention is related are crosslinked polystyrene-type addition polymer resins containing appreciable proportions of recurring units corresponding to N-(ar-vinylbenzyl)glycine, N-(ar-vinylbenzyl)iminodiacetic acid, 2-(ar-vinylphenyl)glycine, and N-(ar-vinylbenzyl)aspartic acid. The resins are usually employed in the form of small beads or granules.

When such chelate exchange resins are contacted with starting ammoniacal aqueous liquid solutions containing ammine complex ions of at least two of the metals copper, nickel, and cobalt in the form of bivalent ammine complex ions of cupric copper having ammonia coordination of from two to four, bivalent ammine complex ions of nickelous nickel having ammonia coordination of from two to six, and trivalent ammine complex ions of cobaltic cobalt having ammonia coordination of from two to six, the resulting metal-laden chelate exchange resin invariably contains a mixture of the metals corresponding in kind to the starting mixture. However, the proportion of metals bound to the chelate exchange resin is usually different from the proportion of such metals contained in the starting solution in consequence of the preferential selectivity of the chelate resin for the different chelatable metals.

The metals, i.e. the mixture of at least two of the metals copper, nickel, and cobalt bound to the aminocarboxylic acid ligands in chelate form, in the metal-laden chelate exchange resin can be eluted, and the resin thereby regenerated, by extraction with acids. The eluate of such acidic elution contains metal salts corresponding to a mixture of metals of the kind which which the resin was laden.

It is among the objects of this invention to provide improvement in the process just described, particularly by providing means for selectively eluting the metal values from such water-insoluble solid chelate exchange resins containing aminocarboxylic acid groups as the active chelate ligands laden with a mixture of at least two of the metals copper, nickel, and cobalt from an ammoniacal aqueous liquid starting solution containing the ammine complex ions as specified. Other objects and advantages of the invention will become apparent in the following description.

The objects of this invention have been attained in an improvement in a method wherein a water-insoluble solid chelate exchange resin containing aminocarboxylic acid groups as the active chelate ligands is laden with a mixture of at least two of the metals copper, nickel, and cobalt from an ammoniacal aqueous liquid starting solution containing ammine complex ions as described hereinbefore, which improvement comprises selectively eluting the metals from the chelate resin by removing the metal-laden resin from contact with the starting metal solution, contacting the metal-laden resin with a liquid aqueous eluting solution containing ionized salts of only non-chelating cations and anions which form water-soluble salts with copper, nickel, and cobalt and having a pH value of at least five, i.e., values from five upward as high as are obtainable, preferably until no more metals are extracted from the resin thereby, removing the resin from contact with such salt solution, and contacting the resin with an acidic aqueous liquid having a pH value of at most three, i.e. from three downward as low as is obtainable, preferably until chelat-forming metals are substantially removed from the resin.

For the purposes of the present invention the starting chelate exchange resin should be loaded with such a quantity of chelate-bound metals as to be substantially satiated with at least one of the metals in the starting mixture. Among the ammine complex metal ions with which this invention is concerned, the chelate exchange resins containing aminocarboxylic acid ligands most preferentially chelate with nickel, less with copper, and at least with cobalt. Preferably, the chelate exchange resin is loaded with such a quantity of chelate-bound metals as to be satiated with the least preferentially held metal and almost satiated with the next preferred metal in the starting mixture. For example, in applying the invention to a starting solution containing a mixture of the ammine complex ions of cobalt and nickel, the starting solution is fed to a bed of a water-insoluble, solid chelate exchange resin having active aminocarboxylic acid ligands at least until incipient break-through of cobalt ions in the effluent and preferably until incipient break-through of nickel ions. The resulting metal-laden resin is then removed from contact with the metal-containing feed solution, preferably by displacing the latter with water, and is ready for selective elution with an aqueous salt eluting solution in accordance with this invention.

The invention is bottomed on the discovery that, when a water-insoluble solid chelate exchange resin containing aminocarboxylic acid groups as active chelate ligands is laden with a mixture of at least two of the metals copper, nickel, and cobalt from an ammoniacal solution containing ammine complex ions of the same as just described, the treatment of the resulting metal-laden resin with a liquid aqueous solution containing ionized salts of only non-chelating cations and having a pH value of at least five causes the selective elution of the metals from the chelate resin in the preferential order of cobalt first, then copper, then nickel lastly if at all.

Any water-soluble ionizable salt can be used whose cation is not capable of forming a stable chelate structure with the aminocarboxylic acid group and whose anion forms water-soluble salts with the metal or metals bound to the resin. Particularly suitable are the alkali-metal salts, e.g. salts of sodium, potassium, and lithium, and ammonium and organic amine salts, such as chlorides and other halides, nitrates, sulfates, and acetates. Where a volatilizable salt is desired, ammonium chloride or sulfate is particularly preferred.

The concentration of the salt in the solution can vary widely, e.g. from one percent or less to twenty percent or more, by weight, and the elution power varies somewhat proportionately to the concentration of the salt in the eluting solution. With eluting solutions of low salt concentration, e.g. from one to five percent by weight, the rate of elution is lower than at higher concentrations. With eluting solutions of high salt concentration, e.g. from ten to twenty percent by weight, the rate of elution of metal values from the chelate resin is high, but is sometimes somewhat less selective. In most instances, the salt concentration in the eluting solution is preferably from five to ten percent by weight of the solution.

The pH value of the eluting salt solution can be adjusted by the addition of free acid such as sulfuric or hydrochloric acid to lower the pH value or by the addition of free base such as alkali metal hydroxide or ammonia to raise the pH value.

After eluting the metal-laden chelate resin with the salt solution, the chelate-bound metals remaining on the resin are eluted with an aqueous acidic liquid eluting solution having a pH value of at most three, such as dilute hydrochloric or sulfuric acid, the aminocarboxylic acid groups in the resin being thereby regenerated to active ligand form.

The following examples illustrate the invention but are not to be construed as limiting the same.

*Example 1*

A water-insoluble solid chelate exchange resin corresponding to polymeric N-(ar-vinylbenzyl)iminodiacetic acid crosslinked with approximately one percent by weight of divinylbenzene and in the form of small spheroidal beads was placed in a vertically disposed one-inch inside diameter column of the kind conventionally used for ion exchange operations. The bed of resin was flooded with an aqueous 1-molar ammonium hydroxide solution containing 250 grams per liter of ammonium sulfate, the effect of which was to place the carboxylic acid groups of the resin in the ammonium salt form and to fill the interstices of the resin bed with a liquid solution whose specific gravity was greater than that of the feed solution to follow. The volume of the resulting resin bed was approximately 60 ml.

The metal-containing starting solution contained trivalent cobaltic cobalt ammine complex ions having ammonia coordination of from two to six and principally five and divalent nickelous nickel ammine complex ions having ammonia coordination of from two to six and principally six, the solution being 0.151 molar in respect to the cobalt ammine complex ions and 0.136 molar in respect to the nickel ammine complex ions and containing approximately 4 percent by weight of ammonium sulfate.

The metal-containing starting solution was fed to the top of the above-described resin bed at an average rate of approximately 4.8 mls. per minute, displacing liquid from the bottom of the column as effluent, until a total of 155 mls. of feed solution had been fed to the resin bed.

The feed solution was followed by a water wash of approximately 85 mls., fed to the top of the resin bed at the same average rate of approximately 4.8 mls. per minute, displacing the metal-containing feed solution from the bottom of the resin bed.

During these steps, i.e. feeding the starting metal-containing solution and water wash to the bed, effluent fractions were taken, analyzed, and found to contain a total of approximately 17.5 milligram-moles of cobalt compounds and only a trace of nickel.

The resulting metal-laden chelate exchange resin bed contained approximately 5.9 milligram-atoms of cobalt and approximately 21.1 milligram-atoms of nickel in the form of chelate complexes bound to the resin. Previous experience had shown that elution of such metal-laden resin with dilute aqueous acid such as dilute sulfuric acid would remove substantially all of the metal values from the resin and produce an eluate containing a mixture of cobalt and nickel salts in approximately the proportion in which these metals were held in the metal-laden resin bed.

In accordance with the present invention, there was fed to the top of the metal-laden resin bed a water solution which was 1-molar in respect to ammonium hydroxide and which contained 5 percent by weight of ammonium sulfate, the pH value of which solution was approximately 10, the solution being fed to the resin bed at an average rate of approximately 4.8 mls. per minute, thereby displacing liquid effluent from the bottom of the resin bed until the instantaneous effluent was substantially free of metals. A total of 210 mls. of such effluent was thereby collected, analyzed and found to contain approximately 5.9 milligram-atoms of cobalt and 0.43 milligram-atoms of nickel. These values correspond to removal of substantially all of the cobalt and only approximately 2 percent of the nickel from the metal-laden chelate exchange resin by the salt-solution elution step.

The resulting resin bed was then eluted by feeding to the top thereof a 4-Normal sulfuric acid solution in water (pH value less than 1), at an average rate of approximately 4.8 mls. per minute, displacing further effluent from the bottom of the resin bed until the instantaneous effluent was substantially free of metals. A total of 110 mls. of acidic eluate was thereby collected, analyzed, and found to contain 20.4 milligram-atoms of nickel and only a trace of cobalt. The nickel value corresponds to removal of substantially all of the nickel from the chelate exchange resin bed.

In recapitulation, the results of the foregoing chelate exchange operation were as follows:

| | Cobalt, mg.-atoms | Nickel, mg.-atoms |
| --- | --- | --- |
| Feed Solution | 23.4 | 21.1 |
| Effluent during feed and water wash | 17.5 | trace |
| Ammonium Sulfate eluate | 5.9 | 0.43 |
| Sulfuric Acid eluate | trace | 20.4 |

It will be seen from these data that the present invention provided means in the salt solution elution step following the loading step for selectively eluting substantially all of the cobalt from the mixed-metal resin bed (without an appreciable removal of nickel), in consequence of which the eluate in the subsequent acid elution step was a nickel salt solution containing only a trace of cobalt.

The cobalt-rich, nickel-poor ammonium sulfate salt eluate fraction can, of course, be employed as part of the feed back to the regenerated chelate exchange resin bed in another cycle of operation, the metal values being thereby recovered, or the solution can be used in other ways.

The acid-eluted chelate exchange resin bed can be used again in another cycle of operations as described in the foregoing example.

*Example 2*

Chelate exchange resin beads of the kind described in Example 1 were placed to a depth of 20 inches in a vertically disposed two-inch inside diameter column of the kind conventionally used for ion exchange operations. The resin bed was flooded with an aqueous 1-molar ammonium hydroxide solution containing 250 grams per liter of ammonium sulfate.

A starting feed solution containing trivalent cobaltic cobalt ammine complex ions in approximately 0.15 molar concentration, divalent nickelous nickel ammine complex ions in approximately 0.13 molar concentration, and approximately 4 percent by weight ammonium sulfate was fed to the top of the resin bed at an average rate corresponding to approximately 0.25 gallon per square foot (cross section of the bed normal to the direction of flow) per minute, thereby displacing liquid effluent from the bottom of the resin bed at an equivalent rate. When approximately three liters of the starting solution had been fed to the bed (corresponding to approximately 450 milligram-atoms of cobalt and 390 milligram-atoms of nickel), the feed of starting metal-containing solution was stopped, and water was fed to the bed until the instantaneous effluent was substantially free of metal compounds. The total effluent collected during the feed and water wash was analyzed and found to contain approximately 379 milligram-atoms of cobalt and only 0.7 milligram-atom of nickel, corresponding to 99.8 atom percent cobalt and 0.2 atom percent of nickel in the mixture. Approximately 84 percent of the cobalt feed to the resin bed was thereby obtained in highly pure form.

Following the water wash, there was fed to the top of the resin bed (at the same average rate of approximately 0.25 gallon per square foot per minute) an aqueous salt eluting solution which was 1-molar in respect to ammonium hydroxide and which contained 5 percent by weight of ammonium sulfate, the pH value of which solution was approximately 10. The salt eluting solution was fed to the resin bed, displacing liquid effluent from the bottom of the resin bed until the instantaneous effluent was substantially free of metals. The total salt eluate so obtained was analyzed and found to contain approximately 46.3 milligram-atoms of cobalt and approximately 44.3 milligram-atoms of nickel.

After the salt solution elution step, there was fed to the top of the resin bed, at the same average rate as before, an acidic eluting solution in the form of a 4-Normal solution of sulfuric acid in water (pH value less than 1), thereby displacing effluent from the bottom of the resin bed. When the instantaneous effluent was substantially free of metals, the collected acidic eluate was analyzed and found to contain approximately 340.8 milligram-atoms of nickel which was approximately 99.5 percent pure, on an atom percent basis, relative to approximately 0.5 atom percent of cobalt.

Again it can be seen that the process of the invention provided means for treating a starting solution containing a mixture of cobalt and nickel to obtain therefrom a high yield of cobalt in a form of high purity (containing only a trace of nickel) and a high yield of nickel (containing only a trace of cobalt).

Example 3

A water-soluble solid chelate exchange resin of the kind described in Example 1 was laden with a mixture of copper and nickel from an ammoniacal aqueous liquid solution containing bivalent ammine complex ions of the metals in equimolar concentrations. The metal-laden beads were washed with water and eluted with an ammoniacal aqueous liquid solution containing 5 percent by weight of ammonium sulfate. Copper was thereby eluted from the resin preferentially to nickel. When the elution of metals by the salt eluting solution was substantially complete, the remaining metals on the chelate resin were eluted therefrom with dilute sulfuric acid aqueous solution. The acid eluate contained nickel and copper in an atom ratio of 16 nickel to 1 copper.

Example 4

A water-insoluble solid chelate exchange resin of the kind described in Example 1 is laden with a mixture of copper and cobalt from an aqueous liquid solution containing bivalent ammine complex ions of copper and trivalent ammine complex ions of cobalt. The resulting metal-laden resin is washed with water and eluted with an ammoniacal ammonium sulfate aqueous solution, whereby the cobalt is selectively and substantially eluted from the resin. After completion of the salt solution elution step, elution of the resin with sulfuric acid aqueous solution removes the copper in an acidic eluate that is substantially free of cobalt.

In place of the chelate exchange resins employed in the foregoing examples, there can be used any water-insoluble solid chelate exchange resin in which $\alpha$- or $\beta$-aminocarboxylic acid groups constitute the active chelate-forming ligands and which are capable of forming metal chelate complexes with copper, nickel, and cobalt.

In place of the particular metal-containing starting feed solutions used in the foregoing examples, there can be used any ammoniacal aqueous liquid solution containing ammine complex ions of any two or more of the metals copper, nickel, and cobalt in the form of bivalent ammine complex ions of cupric copper having ammonia coordination of from two to four, bivalent ammine complex ions of nickelous nickel having ammonia coordination of from two to six, and trivalent ammine complex ions of cobaltic cobalt having ammonia coordination of from two to six. The ammine complex metal ions can be associated in the solution with any solubilizing anions, such as chloride, sulfate, and nitrate ions. Other non-chelating metal and non-metal compounds can also be present in the starting solution, such as alkali metal salts, ammonium salts, and amine salts. The concentration of the copper, nickel, and/or cobalt ammine complex salts in the starting solution can vary widely up to saturation values. Since the chelate exchange resins are capable of extracting chelatable metal values from extremely dilute solutions, the method can be practiced on starting solutions containing mere traces of such metals such as might be obtained in mine tailings and waste waters and in metallurgical and other metal working operations.

In place of the ammonium sulfate salt solutions used in the salt solution eluting step in the foregoing examples, there can be employed other salt solutions differing therefrom as to the concentration and/or kind of salt solute and having a pH value of at least five as hereinbefore described.

In place of acidic eluting solutions containing sulfuric acid, there can be used eluting solutions having pH values of at most three and containing other acids capable of solubilizing copper, nickel, and cobalt compounds, such as hydrochloric and other hydrohalogen acids, and nitric acid.

It will be understood that the specific results obtained by employing various embodiments of the process herein described will vary as a function of the selected variables. However, it will be found that, when a water-insoluble solid chelate exchange resin having aminocarboxylic acid groups as active chelate ligands is laden with a mixture of at least two of the metals copper, nickel and cobalt from an ammoniacal aqueous liquid solution containing ammine complex ions of such metals, the metals on such resin can be selectively eluted therefrom by means of a liquid aqueous eluting solution containing ionized salts of only non-chelating cations and having a pH value of at least five.

It will also be understood that the feeding of the several liquid solutions to the chelate exchange resin bed can be carried out in upward, downward, or transverse direction, that the operations can be carried out at any convenient pressure and temperature between the congelation and boiling points of the liquid solutions, and further that the method of the invention can be practiced in batch, semi-continuous, continuous and other manners that will be obvious to one skilled in the art in view of the foregoing description.

What is claimed is:

1. In a method wherein a water-insoluble solid chelate exchange resin containing aminocarboxylic acid groups as the active chelate ligands is laden with a mixture of at least two of the metals copper, nickel, and cobalt in chelated form by contacting the resin with a starting ammoniacal aqueous liquid solution containing ammine complex ions of at least two of the metals copper, nickel, and cobalt selected from the group consisting of bivalent ammine complex ions of cupric copper having ammonia coordination of from two to four, bivalent ammine complex ions of nickelous nickel having ammonia coordination of from two to six, and trivalent ammine complex ions of cobaltic cobalt having ammonia coordination of from two to six until the chelate exchange resin is satiated with at least one of the metals in the starting solution, the improvement which comprises selectively eluting the metals from the chelate resin by removing the metal-laden resin from contact with the starting metal solution, contacting the metal-laden resin with a liquid aqueous solution containing ionized salts of only non-chelating cations and having a pH value of at least five until no more metals are extracted from the resin thereby, removing the resin from contact with such salt solution, and contacting the resin with an acidic aqueous liquid having a pH value of at most three.

2. The improvement according to claim 1 wherein the liquid aqueous solution containing ionized salts of only non-chelating cations and having a pH value of at least five is an ammoniacal solution of ammonium sulfate containing from one to twenty percent by weight of ammonium sulfate.

3. The improvement according to claim 1 wherein the water-insoluble solid chelate exchange resin is a cross-linked addition polymer containing recurring units corresponding to N-(ar-vinylbenzyl)iminodiacetic acid, the liquid aqueous solution containing ionized salts of only non-chelating cations and having a pH value of at least five is an ammoniacal solution of ammonium sulfate containing from one to twenty percent by weight of ammonium sulfate, and wherein the acidic aqueous liquid having a pH value of at most three is a sulfuric acid aqueous solution.

4. The improvement according to claim 3 wherein the metals in the form of ammine complex ions in the starting ammoniacal aqueous liquid solution are copper and nickel.

5. The improvement according to claim 3 wherein the metals in the form of ammine complex ions in the starting ammoniacal aqueous liquid solution are copper and cobalt.

6. The improvement according to claim 3 wherein the metals in the form of ammine complex ions in the starting ammoniacal aqueous liquid solution are nickel and cobalt.

References Cited in the file of this patent

UNITED STATES PATENTS 2,184,943     Pattock et al.   ---------- Dec. 26, 1939

OTHER REFERENCES

Industrial and Engineering Chemistry, Gregor et al., vol. 44 (1952), pages 2834–2838.

Martell et al.: "Chemistry of the Metal Chelate Compounds," publ. by Prentice-Hall, Inc., New York (1952), pages 433, 434, 446, 532, 533 and 535 relied on.

Burstall et al.: "Ind. & Eng. Chem," vol. 45, No. 8, pp. 1648–1658, August 1953, page 1656 relied on.

Research, Hale, vol. 9, 1956, pages 104–108.